(12) United States Patent
Sjöstrand et al.

(10) Patent No.: US 6,384,765 B1
(45) Date of Patent: May 7, 2002

(54) REPEATER JAMMING TRANSMITTER AND CASING FOR THE SAME

(75) Inventors: Per Sjöstrand, Stockholm; Jan Grabs, Bålsta; Alf Näsvall, Sundbyberg, all of (SE)

(73) Assignee: Celsiustech Electronics AB, Jarfalla (SE)

( * ) Notice: Subject to any disclaimer, the term of this patent is extended or adjusted under 35 U.S.C. 154(b) by 0 days.

(21) Appl. No.: 09/434,372

(22) Filed: Nov. 5, 1999

(30) Foreign Application Priority Data

Nov. 18, 1998 (SE) ................................. 9803935

(51) Int. Cl.⁷ ................................. G01S 7/38
(52) U.S. Cl. ........................ 342/15; 342/198; 342/9; 342/188
(58) Field of Search ........................... 342/13, 14, 15, 342/9, 187, 198

(56) References Cited

U.S. PATENT DOCUMENTS

| | | | | |
|---|---|---|---|---|
| 3,339,201 A | * | 8/1967 | Fischer et al. | 342/14 |
| 3,706,994 A | | 12/1972 | Uhrig | |
| 4,808,999 A | * | 2/1989 | Toman | 342/15 |
| 4,891,649 A | * | 1/1990 | Labaar et al. | 342/203 |
| 4,943,811 A | * | 7/1990 | Alden et al. | 343/814 |
| 5,136,295 A | * | 8/1992 | Bull et al. | 342/15 |
| 5,260,820 A | * | 11/1993 | Bull et al. | 359/145 |
| 5,373,297 A | | 12/1994 | Briguglio | 342/15 |
| 5,398,032 A | * | 3/1995 | Tucker et al. | 342/9 |
| 5,786,786 A | * | 7/1998 | Small | 342/13 |
| 6,061,017 A | * | 5/2000 | Vaccaro et al. | 342/187 |
| 6,141,539 A | * | 10/2000 | Marino | 455/78 |

FOREIGN PATENT DOCUMENTS

FR   2 676 125   11/1981

\* cited by examiner

*Primary Examiner*—John B. Sotomayor

(57) ABSTRACT

This invention concerns a repeater jamming transmitter (2), and a casing arrangement with repeater jamming transmitter. The repeater jamming transmitter (2) comprises transmitter antenna (7), receiver antenna (8) and electronics part (10) with amplifier and control circuits. In order to avoid self-oscillation caused by leakage between the transmitter antenna (7) and the receiver antenna (8) and to maintain the isolation a special connection arrangement (7,8,10) is included in the repeater jamming transmitter. By means of the connection arrangement the amplification of the repeater jamming transmitter can be increased without self-oscillation arising.

8 Claims, 3 Drawing Sheets

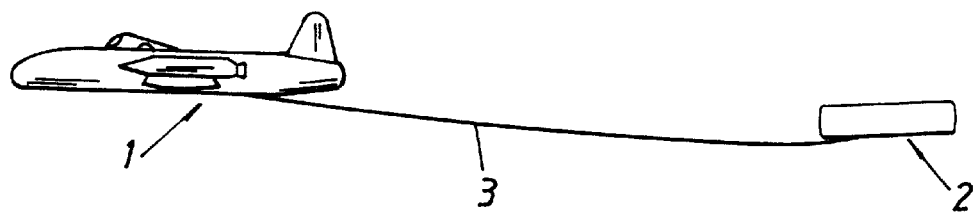
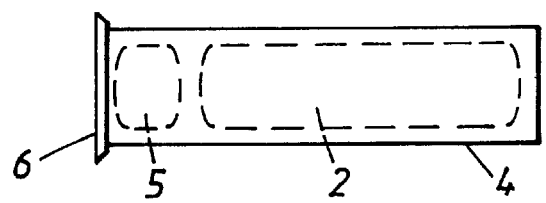
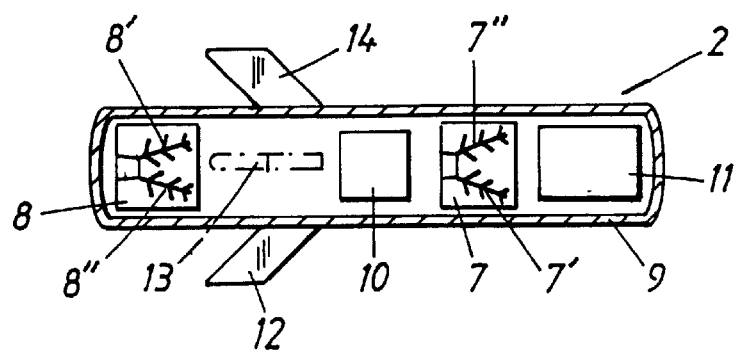

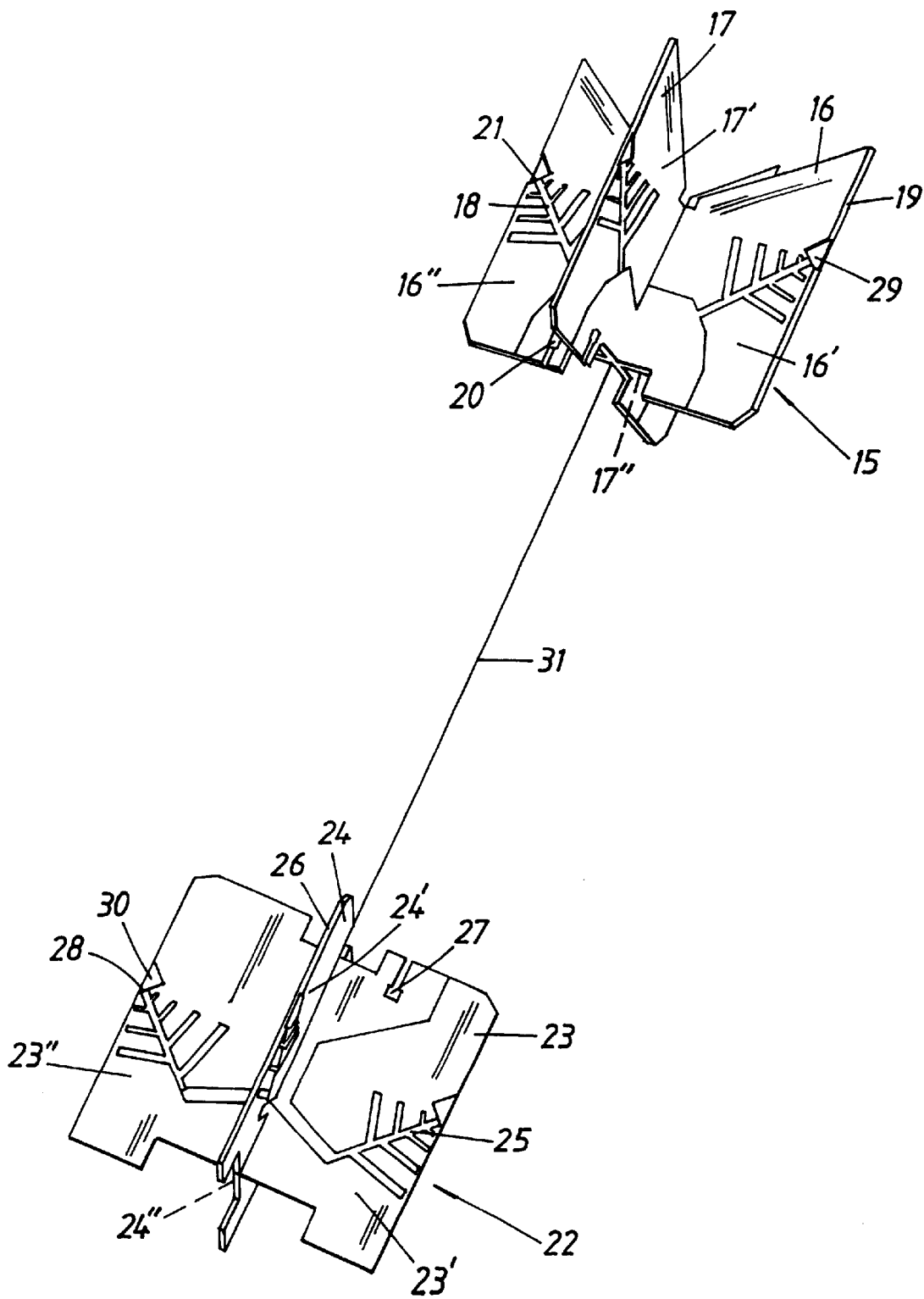

REPEATER JAMMING TRANSMITTER AND CASING FOR THE SAME

BACKGROUND OF THE INVENTION

This invention concerns a repeater jamming transmitter being arranged to be ejected out of an aircraft and to operate at a distance from the aircraft in motion, comprising receiver antenna, amplifier and transmitter antenna for receiving, amplifying and transmitting signals, the receiver antenna and the transmitter antenna each comprising at least one antenna pair. The invention also concerns a casing arrangement with repeater jamming transmitter.

Repeater jamming transmitters generate an amplified signal by receiving a radar signal, amplifying it in an amplifier and sending the signal out again. The amplified signal creates a mock target for the radar which the radar perceives as having a greater target area the higher the amplification which can be achieved. It is therefore important to attain a high amplification.

On account of leakage between the transmitter antenna and the receiver antenna part of the power sent out in the transmitter antenna will, however, be received by the receiver antenna and amplified. If the amplification at any frequency exceeds the isolation between the transmitter antenna and the receiver antenna, self-oscillation will arise and the mock target will thereby cease to act in the intended way. The isolation between the transmitter antenna and the receiver antenna can be increased by increasing the distance between the antennas and thereby permitting an increase in the amplification. It is, however, desirable to have a repeater jamming transmitter which has as small dimensions as possible. A mock target is thus created with favourable characteristics. At the same time the repeater jamming transmitter takes up less space and can be made lighter, which makes it particularly suitable for installation as airborne equipment. The compact format can also help to keep down the manufacturing costs, which is of particular value as the repeater jamming transmitter is completely separated from the aircraft after use.

SUMMARY OF THE INVENTION

The aim of this invention is to achieve a repeater jamming transmitter with small dimensions which can provide high amplification and has the other benefits of repeater jamming transmitters with small dimensions mentioned above. The aim of the invention is achieved by a repeater jamming transmitter characterized in that the repeater jamming transmitter is designed with broad-band and comprises a connection arrangement for maintaining isolation between the receiver antenna and the transmitter antenna in the angular area where reception and transmission take place simultaneously.

According to one favourable embodiment the connection arrangement for maintaining isolation between the receiver antenna and the transmitter antenna is constituted by an antiphase connection applied to the antenna pair of the transmitter antenna and/or receiver antenna. The transmitter antenna and the receiver antenna can thereby each comprise one or more pairs of antennas and according to a suitable embodiment it is proposed that the transmitter antenna and the receiver antenna comprise two pairs of antennas turned in relation to each other with the aim of receiving and transmitting in two preferably orthogonal polarisations turned in relation to each other.

The pairs of antennas of the receiver antenna and the transmitter antenna can comprise a first and a second outer conductor designed with antenna ribs, and a central conductor. According to a preferred embodiment in order to achieve an antiphase connection in a pair of antennas one antenna tip is connected between the first outer conductor and the central conductor and the second antenna tip is connected between the second outer conductor and the central conductor. According to another preferred embodiment in order to achieve an antiphase connection in a pair of antennas the direction of the antenna ribs in one antenna is arranged in a reversed direction in relation to the second antenna.

The antiphase connection improves the isolation between the transmitter antenna and the receiver antenna. By having one pair of antennas of two corresponding pairs of antennas, one for reception and one for transmission, work in the same phase while the other works in antiphase, the leakage between the transmitter antenna and the receiver antenna will be phased out. The antiphase connection is carried out in connection with the input of the amplifier. However, this places large demands on accuracy in installation as electrical wavelengths from both antennas in the pair of antennas must be very accurately matched. Temperature increases can cause the wavelengths to change, with reduced isolation as a result. By making the antiphase connection direct at the antennas the wavelength problem is avoided. This solution is also cheaper than making the antiphase connection in association with the amplifier.

If one pair of antennas in the same phase and one in antiphase are arranged in the same plane the pair of antennas in antiphase creates a null depth in the normal direction of the pairs of antennas. This null depth coincides with the beam maximum of the pair of antennas connected in the same phase. As the target area is the product of the antenna gain, the value of this beam maximum will decrease. According to a preferred further development of the repeater jamming transmitter it is therefore proposed according to the invention that the antenna planes of the receiver antennas are to be turned in relation to the antenna planes of the transmitter antennas. In particular it is proposed that the turning between the antenna planes of the receiver antennas and the antenna planes of the transmitter antennas is to be of the order of 20°. By turning one antenna plane in relation to the other in this way the null depth can be moved to a direction where it does less harm. By means of the turning the average target area is increased defined over a conical cross section, which is valuable in many fields of application associated with repeater jamming transmitters.

When the amplification is maximized with regard to the isolation, it must be taken into account that the amplification varies with the temperature. This means that there must be margins for coping with the worst cases. In this way considerably poorer performance is obtained also in other cases than what it is possible to achieve without self-oscillation arising in that specific case. A considerable increase in performance can be achieved for the majority of cases by introducing an automatic amplification regulation so that the highest possible amplification is set at different operating instances by measuring when self-oscillation arises in that specific case and thereafter reducing the amplification slightly so that the self-oscillation ceases. According to a further preferred embodiment which permits an increase of the amplification, the repeater jamming transmitter is characterized in that the connection arrangement comprises a means of automatic regulation of the amplification by detection of the amplification level for self-oscillation and reduction of the amplification to a level slightly below the amplification level for self-oscillation.

Advantageously, the means for automatic regulation can comprise an amplification control, power meter and switch arranged between the receiver antenna and the transmitter antenna, whereby reduced power with the switch open in comparison to with the switch closed indicates self-oscillation.

The repeater jamming transmitter can be housed in a casing together with a cable brake attached to the bottom part of the casing. This casing arrangement has obvious advantages as far as handling is concerned.

BRIEF DESCRIPTION OF THE DRAWINGS

In the following the invention will be described in greater detail utilizing examples and with reference to the attached figures, where:

FIG. 1 shows an aircraft towing a repeater jamming transmitter behind it on a cable.

FIG. 2 shows the repeater jamming transmitter according to the invention enclosed in a casing designed for installation in an aircraft.

FIG. 3 shows a diagrammatic side view partly in cross section of a jamming transmitter according to the invention.

FIG. 4 shows in perspective view an example of the design of the transmitter and receiver antennas.

DETAILED DESCRIPTION OF THE INVENTION

Figure 5A:
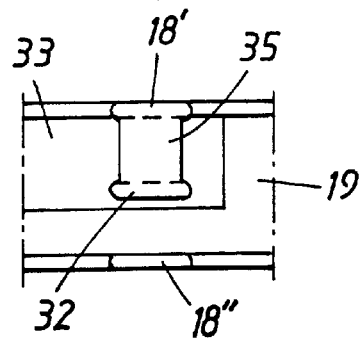
FIGS. 5a and 5b show diagrammatically a second example of antiphase connection directly at the antennas.

FIG. 1 shows an aircraft 1 which tows a repeater jamming transmitter 2 on a cable 3. The repeater jamming transmitter is stored during normal flight in some form of accommodation in connection with the aircraft. For example, the space for droppable ammunition, for example for IR flares or. strips, can be used to house the repeater jamming transmitter. According to FIG. 2 the repeater jamming transmitter 2 is housed in a casing 4 together with a cable brake 5. This embodiment means that the repeater jamming transmitter can easily be housed in compartments dimensioned for droppable ammunition. The control of the repeater jamming transmitter from the aircraft can then be carried out via a connection device (not shown) in the bottom plate 6 of the casing 4.

The repeater jamming transmitter 2 shown diagrammatically in FIG. 3 has a front antenna 7 and a rear antenna 8 housed in a casing 9. One of the antennas 7 and 8 acts as a transmitter antenna and the other as a receiver antenna. In the example described it is assumed that the front antenna 7 acts as transmitter antenna and the rear antenna 8 as a receiver antenna. An electronics part 10 with amplifier and control circuits is connected between the receiver antenna 8 and the transmitter antenna 7. To provide power there is a battery 11 in the front part of the casing. In order to give the repeater jamming transmitter suitable flying properties it is equipped with extending fins 12, 13 and 14 shown in the extended position. The transmitter antenna 7 and the receiver antenna 8 are both shown diagrammatically as a pair of antennas 7', 7" and 8',8" respectively in a common plane. Between the transmitter antenna and receiver antenna means, not shown, can be arranged to prevent internal leakage between the transmitter antenna and the receiver antenna, for example some form of metal screen. The design of the antennas will be discussed in greater detail below with reference to FIGS. 4, 5a and 5b.

The antenna configuration for the repeater jamming transmitter shown in FIG. 4 comprises a front antenna 15 with two pairs of antennas 16, 17 with two antenna units each, 16',16" and 17',17" respectively in a common plane. The antenna units are constructed with a conductive pattern 18 arranged on each side of an isolating layer 19 so that the complete conductive pattern creates a principally symmetrical form. In connection with the pattern 18, a central conductor enclosed by the isolating layer runs from a supply point 20 to the tip 21 of the antenna unit. At the tip of the antenna unit the central conductor is connected to the conductive pattern 18 on one side of the isolating layer 19 and in FIG. 4 the side where the isolating layer 19 has a recess 29.

The antenna configuration comprises in addition a rear antenna 22 constructed in a similar way as the front antenna 15. Thus there are two pairs of antennas 23,24 each with two antenna units 23',23" and 24',24" respectively. The antenna units have in addition a conductive pattern 25 on each side of an isolating layer 26. A central conductor runs within the isolating layer from a connection point 27 to the tip 28 of the antenna unit where the conductor is connected to the conductive pattern on one side of the conductive pattern 25. Specifically in the figure the central conductor is connected to the pattern 25 on the side where the isolating layer has a recess 30.

If the conductive patterns shown for the pairs of antennas 16 and 23 are compared it can be found that the beams from the antenna units in the antenna pair 23 of the rear antenna will interact in the longitudinal direction of the axle 31, while the beams from the antenna units in the antenna pair 16 of the front antenna will counteract each other in the longitudinal direction of the axle 31. An antiphase connection is then brought about in the front antenna which improves the isolation between the front and rear antennas.

Figure 5B:
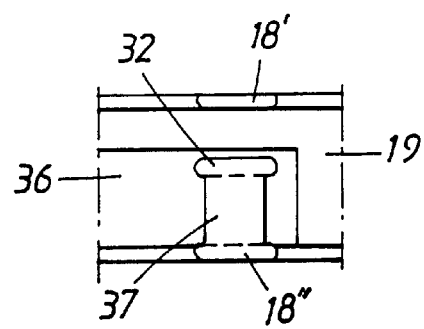

An alternative way of bringing about antiphase connection is shown diagrammatically in FIGS. 5a and 5b. In this case the front antenna 15 according to FIG. 4 has been given the same conductive pattern configuration as the rear antenna 22. In order to bring about antiphase connection in one of the antennas, 15, 22, the ability is used instead to vary the connection of the central conductor 32. According to FIG. 5a a recess 33 is used to connect the central conductor 32 with the pattern 18' on one side of the isolating layer 19 in a pair of antennas via a conductive connection 35. At the same time a recess 36 is arranged to connect the central conductor 32 with the pattern 18" on the other side of the isolating layer 19 in the same pair of antennas via a conductive connector 37.

Figure 6:
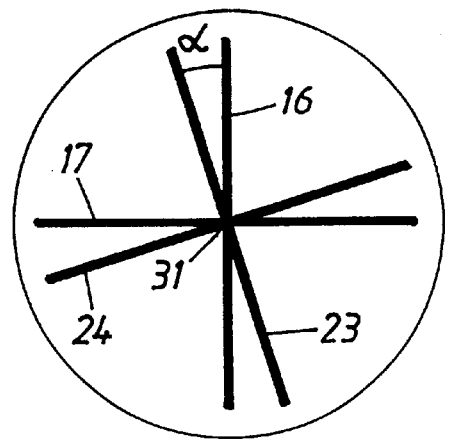
FIG. 6 illustrates diagrammatically the turning of the antenna planes of the transmitter antenna and the receiver antenna with the longitudinal direction of the repeater jamming transmitter perpendicular to the plane of the diagram.

The antenna configuration shown in FIG. 4 has the characteristics that the pair of antennas 23,24 in the rear antenna 22 are turned somewhat in relation to the pairs of antennas 16,17 in the front antenna 15 with respect to the axle 31. This is also illustrated in FIG. 6 which shows the configuration diagrammatically with the axle 31 perpendicular to the plane of the drawing. The turning which is indicated by α in FIG. 6 can suitably have a value of the order of 20°. By turning the pairs of antennas in the way shown the situation is avoided that the antiphase connection creates a null depth in the longitudinal direction of the axle 31 and the null depth is moved to a direction where it does less harm.

Figure 7:
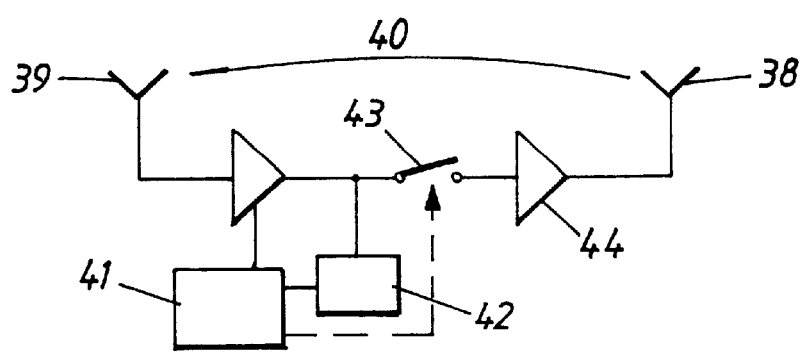
FIG. 7 shows an example of how the amplification regulation can be carried out.

FIG. 7 shows an example of how the amplification regulation can be carried out in order to achieve the highest possible setting of the amplification in each individual operating instance. Between the transmitter antenna 38 and the receiver antenna 39 there is signal leakage indicated by the arrow 40. In order to detect the leakage according to the example shown an amplification control 41, a power meter 42 and a switch 43 are connected in the way shown. The transmitter antenna 38 is supplied via an amplifier 44. The power meter is arranged to measure the power received with an open and closed switch 43 and compare these measurements. If the power meter detects the same power with the switch open and closed, it means that it is an external radar signal which has been amplified. On the other hand if the power disappears when the switch is opened this indicates self-oscillation. By measuring the power with an open and closed switch and adjusting the amplification by means of the amplification control 41 so that the amplification has a setting close to self-oscillation but without self-oscillation arising, the maximal amplification and hence target area can be set for the operating instance concerned.

This invention is not in any way limited to the embodiments described above but can be modified in a multitude of ways within the framework of the invention as described in the patent claims attached to this description.

What is claimed is:

1. A broad-band repeater jamming transmitter comprising a receiver antenna, an amplifier and a transmitter antenna for receiving, amplifying and transmitting signals, which repeater jamming transmitter includes an arrangement, including an antiphase connection, for maintaining isolation between the receiver antenna and the transmitter antenna in an angular area common to reception and transmission characterized in that the repeater jamming transmitter is designed to be ejected out of an aircraft and to operate at a distance from the aircraft in motion, that the receiver antenna and transmitter antenna each comprise at least one pair of antennas and that the arrangement for maintaining the isolation between the receiver antenna and the transmitter antenna comprises an antiphase connection arranged directly in a pair of antennas of the receiver antenna and/or the transmitter antenna.

2. A repeater jamming transmitter according to claim 1, characterized in that the transmitter antenna and receiver antenna comprise two pairs of antennas turned in relation to each other with the aim of receiving and transmitting in two preferably orthogonal polarizations which are turned in relation to each other.

3. A repeater jamming transmitter according to claim 2 where the pairs of antennas of the receiver antenna and transmitter antenna comprise a first and a second outer conductor designed with antenna ribs and a central conductor, characterized in that in order to achieve an antiphase connection in a pair of antennas, one antenna tip is connected between the first outer conductor and the central conductor and the second antenna tip is connected between the second outer conductor and the central conductor.

4. A repeater jamming transmitter according to claim 2, where the pairs of antennas of the receiver antenna and transmitter antenna comprise a first and a second conductor, characterized in that in order to achieve an antiphase connection in a pair of antennas the direction of the antenna ribs in one antenna is arranged in a reversed direction in relation to the second antenna.

5. A repeater jamming transmitter according to claim 1 characterized in that antenna planes of the receiver antenna are turned in relation to antenna planes of the transmitter antenna.

6. A repeater jamming transmitter according to claim 5, characterized in that the turning between the antenna planes of the receiver antenna and the antenna planes of the transmitter antenna is of the order of 20°.

7. A repeater jamming transmitter according to claim 1, where the arrangement comprises means for automatic regulation of amplification by detection of the amplification level for self-oscillation and reduction of the amplification to a level slightly below the amplification level for self-oscillation, characterized in that the means for automatic regulation of amplification comprises an amplification control, a power meter and a switch arranged between the receiver antenna and the transmitter antenna, whereby the reduced power with the switch open in comparison to with the switch closed indicates self-oscillation.

8. A casing, characterized in that the casing is arranged to house a repeater jamming transmitter according to any of claims 1–7 and a cable brake, attached to a bottom part of the casing, having a cable connecting the repeater jamming transmitter with the cable brake at least while it is being ejected.

* * * * *